AUTOMATIC TONE DECODER

Filed June 13, 1957 2 Sheets-Sheet 1

INVENTORS
WILLIAM VERNON HARGREAVES
LOUIS AUSTIN DURGIN
BY Darby & Darby
ATTORNEYS April 18, 1961 W. V. HARGREAVES ET AL 2,980,794

AUTOMATIC TONE DECODER

Filed June 13, 1957 2 Sheets-Sheet 2

INVENTOR.
WILLIAM VERNON HARGREAVES
LOUIS AUSTIN DURGIN.
BY Darby & Darby
ATTORNEYS United States Patent Office 2,980,794
Patented Apr. 18, 1961

2,980,794

AUTOMATIC TONE DECODER

William Vernon Hargreaves, East Paterson, and Louis Austin Durgin, Paterson, N.J., assignors, by mesne assignments, to Fairchild Camera and Instrument Corporation, Syosset, N.Y., a corporation of Delaware Filed June 13, 1957, Ser. No. 665,539

6 Claims. (Cl. 250—6)

This invention relates to mobile communication calling circuits and more particularly to an automatic tone decoder for reducing co-channel annoyances.

Within the past few years two-way mobile communication has found increased uses in many fields. With the increase in users there has been a concurrent increase in demands for frequency allocations within the limited spectrum reserved for mobile equipment and many fleet owners find that their mobile units which, in some instances number in the hundreds, must use the same frequency. The ideal solution in this case would be, for example, to have those units working in one geographical area operating on one frequency, while the units working other areas have their individual frequencies. Since under present conditions this is impossible, the fleet owner is now faced with the problem of calling one unit in one area and having all the units in his fleet annoyed with the ensuing conversation.

Another disconcerting situation that arises, also resulting from the tremendous number of users in a crowded spectrum occurs when, for example, adjacent towns are assigned the same frequency. The mobile receivers in both towns may be awakened by either base station.

Still another disconcerting situation that frequently arises occurs when widely separated towns are assigned the same frequency and the "skip" conditions that usually occur during band openings allows these stations to be heard. It is very common for east coast mobile operators of police radios to head west coast stations when good skip conditions exist.

However, all of these objections would be overcome if the receivers tuned to a given frequency were muted under all conditions and were subsequently caused to be awakened solely by their own base station and by none other. Also, fleet owners whose fleet is broken up into groups operating in different parts of a town, would find it advantageous if he were able to awaken only those receivers in the portion of the town desired.

Therefore, the principal object of the instant invention is to provide an automatic decoder which only awakens selected receivers.

Another object is to provide a decoder capable of awakening a receiver only on reception of a signal from a given transmitter.

Still another object is to automatically maintain a receiver in its awakened condition for the duration of an initially coded transmission.

Figure 1:
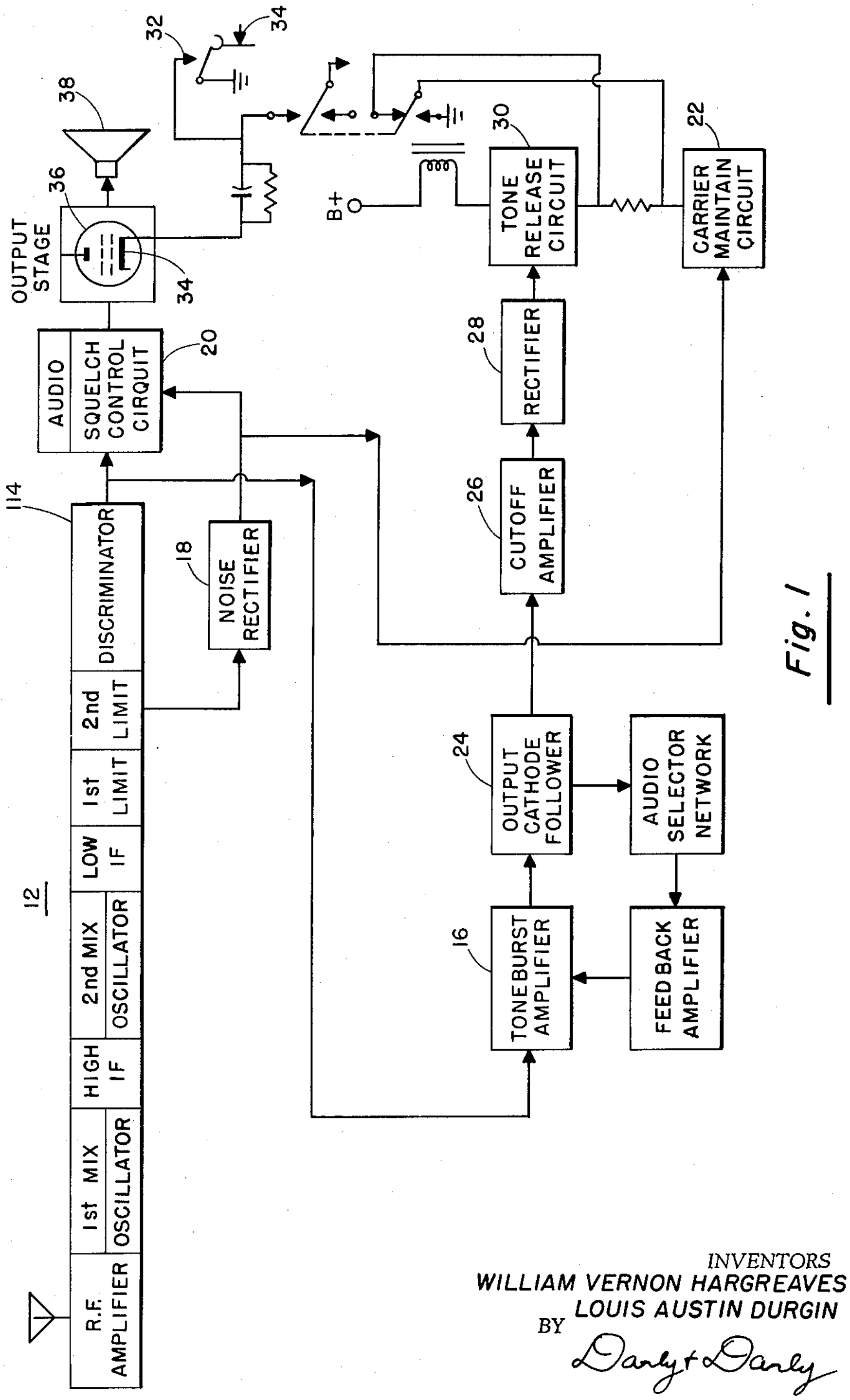
Figure 2:
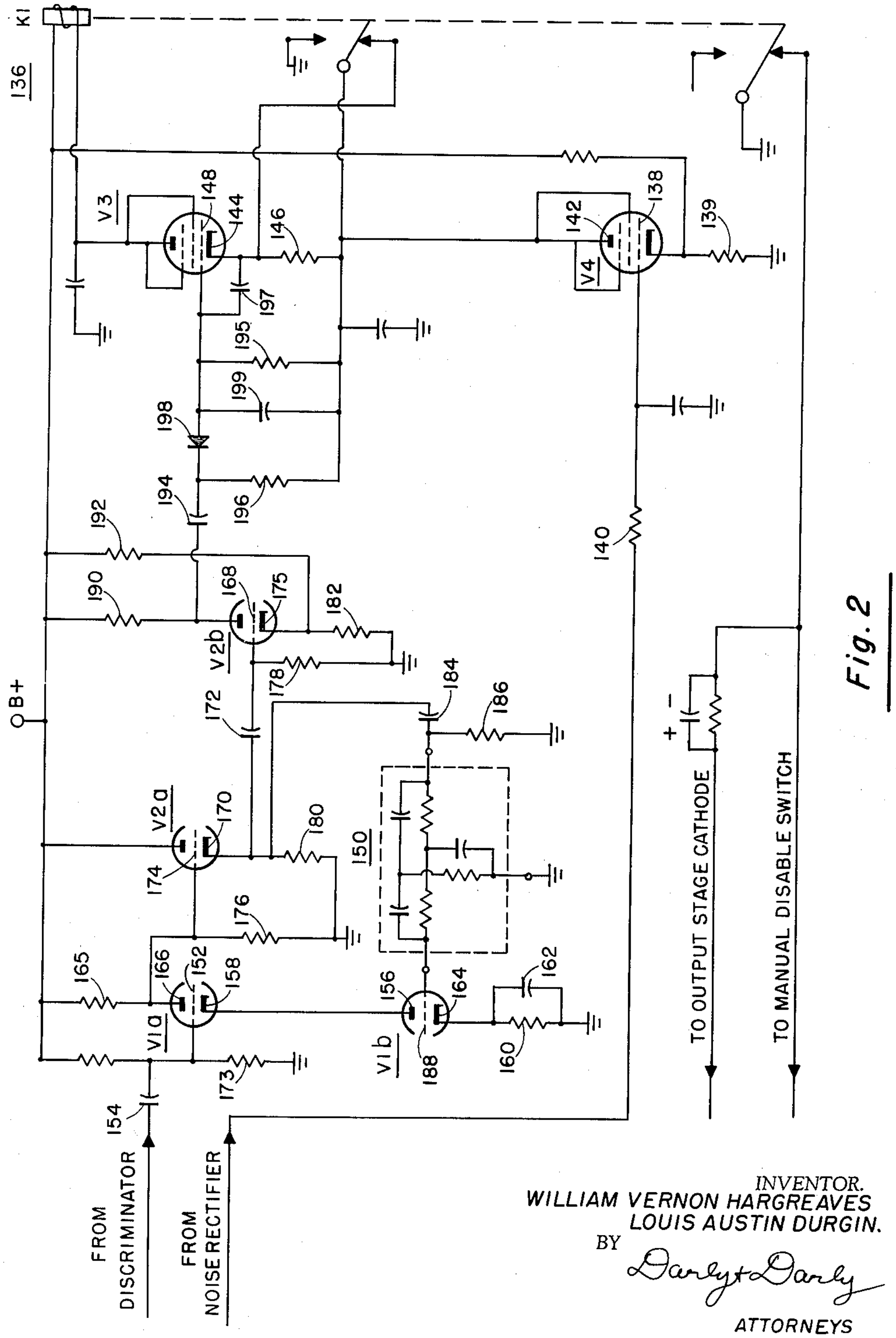

The features of our invention which we believe to be novel are set forth with particularity in the appended claims. Our invention itself, however, both as to its organization and method of operation, together with further objects and advantages thereof, may best be understood by reference to the following description taken in conjunction with the accompanying drawings in which:

Fig. 1 represents a block diagram of a typical frequency modulated mobile communication receiver utilizing our invention; and Fig. 2 represents a schematic representation of the circuit for providing an automatic tone decoder.

Referring now to Fig. 1 there is shown a typical frequency modulated mobile communications receiver 12 using our invention. Receiver 12 in this instance has at least one stage of R.F. amplification followed by a first local oscillator and first mixer, a subsequent stage of high intermediate frequency amplification, a subsequent local oscillator and second mixer stages, and at least one stage of low intermediate frequency amplification followed by two limiter stages. The output of the last limiter stage is simultaneously fed as an input to both discriminator 114 and noise rectifier 18. The output of discriminator 114 is applied to tone burst circuit 16 while the output of the noise rectifier 18 is applied simultaneously to squelch control circuit 20 and to carrier maintaining circuit 22. For a more detailed description of the operation of the noise or hiss rectifier and squelch control circuits, attention is directed to the copending application of William Vernon Hargreaves, Serial No. 511,985, filed May 31, 1955, and assigned to the assignee of the instant application, now Patent No. 2,878,377, issued March 17, 1959.

The output of tone burst amplifier 16 is then applied to output cathode follower stage 24 and then to cutoff amplifier stage 26. The output of stage 26 is applied through rectifier 28 to tone release circuit 30 which acts in conjunction with carrier maintainig circuit 22 to provide our novel function. Our device functions as follows:

During normal operation, with the microphone on "hang up" switch 32, the mobile operator hears absolutely nothing on receiver speaker 38 since the bias resistor 35 for cathode 34 of output stage 36 is ungrounded. However, before the base station can contact a mobile unit, some means must be provided at the transmitter whereby the hang up switch is bypassed and the output stage enabled to allow the mobile operator to hear the transmitted signal. This enabling process is accomplished by prefacing the initial alerting transmission from the base station with a tone burst of a particular audio frequency. Only those muted mobile receivers capable of utilizing this tone burst frequency will hear the alerting transmissions. Therefore, since the enabling process requires a tone burst on the carrier before the mobile operator can hear the transmitted signal the reception of a distant station under good skip conditions will not allow the receiver to be awakened thereby eliminating one source of annoyance. By the same token, there being no prefacing tone burst on the co-channel annoying signal the receiver will still not be awakened thereby removing another source of annoyance. If, upon hearing the initial alerting transmission, the mobile operator determines that the transmission not directed to him, there is nothing further for him to do, his microphone remains on the hang up switch and he hears nothing more than the initial call to all mobile units, although the base station may subsequently conduct a conversation with one of the other members of the mobile fleet. Thus, this operator is spared the annoyance of having to sit through this conversation. However, when the base station operator directs his remarks to one mobile operator, that operator picks up his microphone 33 after the initial alerting transmission thus automatically bringing output stage 36 back into the circuit and a conversation may be carried on with the base station with no fear of annoying operators of other mobile receivers using this system.

All of the above is accomplished in the following manner:

Referring now to Fig. 2 it will be seen that when receiving unit 12 is turned on, relay 136 is initially deenergized. Assuming a condition where no carrier is received it will be seen that as the receiver warms up and tubes V3 and V4 reach their operating potentials and when noise rectifier 18 (Fig. 1) reaches its operating point, a positive 4.5 volts is applied through limiting resistor 140 to grid 138 of tube V4. Since plate 142 is connected directly to cathode 144 of tube V3 through the contacts of the relay 136, cathode bias resistor 146 is effectively short-circuited. In the absence of a carrier, no signal is applied to grid 148 of tube V3 and since resistor 146 is short-circuited, tube V3 is operating at essentially zero bias and about 4 milliamperes of current will flow from B+ through the coil of relay 136 through tubes V3 and V4 thereby energizing relay 136. When relay 136 is energized, plate 142 of tube V4 is grounded and the short-circuit across resistor 146 is removed permitting tube V3 to conduct heavily and carry about 5 mils of current. Now that relay 136 is energized, the receiving operator can hear nothing from his receiver speaker due to the lack of ground return for bias resistor 35 at cathode 34 of output stage 36 (Fig. 1). While the relay is in its energized position, the plate 142 of tube V4 is at ground potential and the reception of a carrier only will have no effect on the conduction of V4. Thus, the operator is not annoyed by other transmissions on his frequency, whether they be due to co-channel interferences or due to unusual skip conditions.

If now the base station desires to alert all units, the transmission is prefaced with a tone burst having a given frequency and duration. This frequency of tone burst to which any receiver will respond is determined by audio selector network 150.

Suppose, for example, that the mobile units in a first area have a 400 cycle audio selector network and the mobile units in a second area have a 700 cycle audio selector network. The mobile operator is in the first area and the base station desires to communicate with him. The base station operator selects a 400 cycle tone, injects it onto the carrier for a given duration (about ½ second) immediately preceding his voice transmission. This awakens all receivers in the first area while allowing the receivers in the second area to remain dormant. Now, when a 400 cycle tone modulates the carrier, the recovered audio output from discriminator 14 (Fig. 1) is applied to grid 152 of tone burst amplifier V1*a* through coupling capacitor 154 (Fig. 2). Cathode 164 of feedback amplifier stage V1*b* is biased near cutoff by the parallel resistance capacitance combination 160—162 allowing this stage to conduct slightly. Since plate 156 of stage V1*b* is connected directly to cathode 158 V1*a*, the initial reception of a signal at grid 152 of V1*a* will produce an output voltage across load resistor 165 of plate 166 of such magnitude as to develop only approximately seven volts R.M.S. across resistor 178 to be applied to grid 168 of tube V2*b*. This is insufficient to drive stage V2*b* out of cutoff since the combination of resistors 192 and 182 biases cathode 175 sufficiently to maintain stage V2*b* normally cutoff.

However, a sample of the 400 cycle signal applied to grid 168 is simultaneously applied to coupling capacitor 184 and developed across resistor 186. This signal is then applied to the input of audio selector network 150 and since the audio selector network is tuned to 400 cycles, the signal now appears across the output of the audio network and is applied to grid 188 of stage V1*b*. This signal (which is in phase with the tone signal applied to grid 152 of V1*a*), causes stage V1*b* to conduct heavily on the positive going excursions of the signal and lightly on negative going excursions thereby allowing higher amplification through stage V1*a*. This higher amplification in V1*a* develops a higher voltage across load resistor 165 and a 15 volt signal now appears across resistor 178 to be applied to grid 168 of stage V2*b*. The positive going portion of the resultant 15 volt sine wave causes stage V2*b* to go into conduction and to amplify greatly on the positive peaks of the cycle resulting in highly amplified negative going pulses being developed across plate resistor 190. The negative going signals are then applied to capacitor 194 and developed across resistor 196 for application to the cathode side of diode 198. The combined action of the network comprising capacitors 199, 197 and resistor 195 produces a negative going square wave which when applied to grid 148 of stage V3 biases stage V3 to cutoff for the duration of the tone burst. Since stage V4 is already deenergized, as soon as stage V3 is biased to cutoff, relay 136 becomes deenergized grounding bias resistor 35 of cathode 34 of output stage 36 (Fig. 1) allowing speaker 38 to become enabled. Thus, the presence of the correct tone on the carrier has energized the operator's speaker. Even if no words are now spoken, the presence of the carrier prevents stake V4 from conducting. This is due to the fact that the lowered rectified noise voltage developed by the noise rectifier on reception of a signal lessens the conduction of V4 and the relay will be maintained in its deenergized position for the length of time the carrier remains on the air. At this point, the called operator may, if he chooses, remove his microphone from the hang up switch thereby bypassing relay 136 and thus be able to carry on a conversation with the base station. The other mobile units in the group leave their microphones on their respective hang up switches and are not annoyed by the subsequent conversation.

It should be here noted that there are distinct advantages to cutting off a tube to provide a function rather than driving the tube into conduction to perform the same function. Biasing stage V3 to cutoff allows for sharp operation since the normal sluggish rise time in conduction rate that most triode tubes are subject to is not a matter of concern. In any event, the ensuing saving in driving power (to drive the tube to conduction) is a very desirable feature particularly in mobile equipment where any saving in driving power is a desirable feature.

Since grid 168 of stage V2*b* is coupled to cathode 170 of stage V2*a* through coupling condenser 172 and grid 174 of stage V2*a* is connected directly to plate 166 of V1*a*, stage V2*a* functions as a cathode follower. Suitable grid bias for stages V1*a* and V2*a* are provided by biasing resistors 173 and 176 respectively. Cathode bias for stages V4, V2*a* and V2*b* are provided by resistors 139, 180 and 182 respectively.

Audio selector network 150 is a band pass filter and may be, for example, the type of bandpass filter described in Terman's "Radio Engineers' Handbook," 1943 edition, page 918, Figure 23(*d*).

If now, a 700 cycle tone burst immediately precedes the transmission and is received on a receiver whose audio selector network is tuned to 400 cycles, the sample signal obtained from cathode 170 of V2*a* will not appear at the output of the audio selector network. Thus, stage V1*b* still only conducts slightly and since no rengeneration is applied to stage V1*a*, stage V2*b* remains cutoff. Therefore, when the base station desires to contact those mobile units having a 700 cycle tone network, the receivers with 400 cycle tone networks are not awakened and in fact do not even hear the initial alerting transmission.

Having set forth our novel invention it is readily seen that this device lends itself to other combinations of fixed base station to mobile alerting, mobile to fixed base station alerting as well as mobile to mobile alerting. In this connection, if in the prior example of two mobile groups having a 400 cycle tone network and a 700 cycle tone network, the base station is now equipped with a 900 cycle tone network in its receiver, there would be no annoying transmissions if each mobile station transmitter were equipped for providing a prefacing 900 cycle tone burst. Thus, any mobile station can call the base station with no fear of annoying other base stations or other mobile units.

By the same token, if the mobile transmitters were equipped to provide either a 400, 700 or 900 cycle prefacing tone burst, the mobile operator could selectively call the mobile units in his group, mobile units of another group, or the base station respectively without annoying any members of other groups.

Another interesting feature of our invention is the facility with which a disabling mechanism can be added to overcome the difficulties should any of the stages of our invention become inoperative. By the simple expedient of providing a switch functioning to ground the cathode return of the output audio stage, the mobile operator can remain in contact with all stations should any of the stages of this invention fail.

While there has been described what is presently considered a preferred embodiment of the invention, it will be obvious to those skilled in the art that various changes and modifications may be made therein without departing from the inventive concept, and it is aimed in the appended claims to cover all such changes and modifications as fall within the true spirit and scope of the invention.

What is claimed is:

1. An automatic tone decoder operable by a transmitter having means to modulate a tone burst of a given frequency and short duration upon the carrier wave during the initial transmission of a series of transmissions, said decoder comprising, in combination, a receiver having an output stage with a cathode resistor, means normally muting said receiver, a normally energized relay having an energizing coil, said relay in its deenergized position providing a ground return for the cathode of said output stage, a tone burst amplifier stage, an output cathode follower stage, means applying the output of said amplifier stage to an input of said cathode follower stage, a normally cutoff amplifier, means applying the output of said cathode follower to an input of said cutoff amplifier to drive said amplifier out of cutoff on reception of a tone burst frequency, a tone release amplifier the output of which is fed to said relay energizing coil, means for applying the highly amplified negative going signal output of said cutoff amplifier to said tone release amplifier to drive said tone release amplifier into cutoff to thereby deenergize said relay and unmute said receiver upon reception of a tone burst frequency, means maintaining said relay deenergized and said receiver unmuted for the duration of an initial transmission, means automatically energizing said relay and remuting said receiver upon termination of an initial transmission, and means for defeating the remuting of said receiver, said means comprising a manually operable hook switch providing a ground return for said cathode resistor.

2. A receiver having an output stage with a cathode resistor adapted to be returned to ground, the receiver being adapted to be awakened by a single tone burst of a given frequency and short duration, said receiver comprising, in combination, a circuit responsive to a short tone burst of the given frequency, a normally energized relay having a coil, a tone release amplifier in series with said relay coil, means driving said tone release amplifier into cutoff in response to an output signal from said responsive circuit to thereby deenergize said relay and provide a ground return for the cathode resistor, means maintaining said receiver unmuted for the duration of the transmission following said tone burst, means automatically remuting said receiver upon termination of said transmission, and means for defeating said unmuting, said defeating means comprising a manually operable switch for supplying a ground return to the cathode resistor.

3. The device of claim 1 comprising a feedback circuit between the output of said cathode follower stage and said tone burst amplifier stage comprising an audio selector network and a feedback amplifier whereby, when said input frequency to said tone burst amplifier coincides with the resonant frequency of said audio selector network, a more highly amplified signal is applied as an input to said cutoff amplifier to drive said cutoff amplifier into conduction.

4. The device of claim 3 further comprising a carrier release amplifier in series with said tone release amplifier and the coil of said relay, means grounding the output of said carrier release amplifier when said relay is energized and means decreasing the input voltage to said carrier release amplifier below the point of conduction for the duration of said transmission from said transmitter thereby maintaining said receiver unmuted for the duration of said initial transmission.

5. The device of claim 2 comprising a feedback circuit applying the output of said cathode follower stage as an input to said tone burst amplifier stage, said feedback circuit comprising an audio selector network and a feedback amplifier whereby when said input frequency to said tone burst amplifier coincides with the resonant frequency of said audio selector network a more highly amplified signal is applied as an input to said cutoff amplifier to drive said cutoff amplifier into conduction.

6. The device of claim 5 further comprising a carrier release amplifier in series with said tone release amplifier and the coil of said relay, means grounding the output of said carrier release amplifier when said relay is energized and means decreasing the input voltage to said carrier release amplifier below the point of conduction for the duration of a received transmission thereby maintaining said receiver unmuted for the duration of said transmission.

References Cited in the file of this patent

UNITED STATES PATENTS

| | | |
|---|---|---|
| 2,457,149 | Herbst | Dec. 28, 1948 |
| 2,524,782 | Ferrar et al. | Oct. 10, 1950 |
| 2,546,987 | Eannarino | Apr. 3, 1951 |
| 2,579,470 | Brown | Dec. 25, 1951 |
| 2,679,000 | Reynolds | May 18, 1954 |
| 2,724,049 | Rouault | Nov. 15, 1955 |

FOREIGN PATENTS

| | | |
|---|---|---|
| 720,699 | Great Britain | Dec. 22, 1954 |